(12) United States Patent
Johnston et al.

(10) Patent No.: US 10,638,257 B2
(45) Date of Patent: Apr. 28, 2020

(54) DATA COMMUNICATION APPARATUS AND METHOD FOR VERIFICATION AND SERVICE PROVISION

(71) Applicant: JUST EAT HOLDING LIMITED, Borehamwood Hertfordshire (GB)

(72) Inventors: Bennie Johnston, Borehamwood Hertfordshire (GB); Ahmed Malik, Borehamwood Hertfordshire (GB)

(73) Assignee: Just Eat Holding Limited, Borehamwood, Hertfordshire (GB)

( * ) Notice: Subject to any disclaimer, the term of this patent is extended or adjusted under 35 U.S.C. 154(b) by 0 days.

(21) Appl. No.: 16/314,247

(22) PCT Filed: Jun. 29, 2017

(86) PCT No.: PCT/GB2017/051915
§ 371 (c)(1),
(2) Date: Dec. 28, 2018

(87) PCT Pub. No.: WO2018/002638
PCT Pub. Date: Jan. 4, 2018

(65) Prior Publication Data
US 2019/0327700 A1 Oct. 24, 2019

(30) Foreign Application Priority Data

Jun. 30, 2016 (GB) .................................. 1611487.8
Jan. 31, 2017 (GB) .................................. 1701599.1

(51) Int. Cl.
*H04W 4/00* (2018.01)
*H04W 4/021* (2018.01)
(Continued)

(52) U.S. Cl.
CPC ............ *H04W 4/021* (2013.01); *H04W 4/029* (2018.02); *H04W 4/80* (2018.02); *H04W 12/08* (2013.01); *H04W 60/04* (2013.01); *H04W 64/00* (2013.01)

(58) Field of Classification Search
CPC ....... H04W 60/04; H04W 4/80; H04W 4/021; H04W 12/08; H04W 64/00; H04W 4/008;
(Continued)

(56) References Cited

U.S. PATENT DOCUMENTS

2010/0217837 A1* 8/2010 Ansari .................. G06Q 30/04
709/218
2011/0231443 A1* 9/2011 Hannel ................ H04L 63/105
707/776

(Continued)

OTHER PUBLICATIONS

International Search Report and Written Opinion dated Dec. 15, 2017 in International Patent Application No. PCT/GB2017/051915.
Search and Examination Report dated Jan. 19, 2017 in United Kingdom Patent Application No. GB1611487.8.

*Primary Examiner* — Nathan S Taylor
(74) *Attorney, Agent, or Firm* — Norton Rose Fulbright US LLP

(57) ABSTRACT

Data communication apparatus and method for verification and service provision. A system for controlling data communication at a facility 22 includes: (i) a server 31 for communication with devices at the facility 22; (ii) a data store 40; and (iii) a wide area communication interface 28 for communication between the server 31 and the facility 22. The server 31 is configured to receive identifier data, location data and facility data from a user of a first device 24 at the facility 22, and to select, based on the facility data, an association from the data store 40 and send it to the first device 24. The server 31 is configured to receive a selection message from the first device 24 and send to a second device 26 associated with the facility 22 a verification message.

18 Claims, 3 Drawing Sheets

(51) Int. Cl.
*H04W 4/029* (2018.01)
*H04W 4/80* (2018.01)
*H04W 12/08* (2009.01)
*H04W 60/04* (2009.01)
*H04W 64/00* (2009.01)

(58) Field of Classification Search
CPC ....... H04W 4/02; H04W 12/06; H04W 8/005;
H04W 12/00; H04W 12/0013; H04W
12/0023; H04W 12/04031; H04W
12/0605; H04W 40/244; H04W 4/029;
H04W 76/11; H04W 76/14; H04L 63/08;
H04L 63/0853; H04L 63/107; H04L
2463/062; H04L 67/16; H04L 12/2803;
H04L 12/2807; H04L 12/2812; H04L
12/2814; H04L 12/2818; H04L 12/66;
H04L 2012/2849; H04L 29/06027; H04L
29/12132; H04L 29/12169; H04L
41/0803; H04L 41/12; H04L 41/22; H04L
47/80; H04L 49/25; H04L 61/1552; H04L
61/1576; H04L 63/02; H04L 63/10; H04L
63/20; H04L 65/102; H04L 67/104; H04L
67/125; H04L 67/141; H04L 67/18; H04L
67/20; H04L 67/42; H04L 69/325
USPC ............ 455/435.1, 41.2; 709/224, 218, 231;
725/93; 726/21
See application file for complete search history.

(56) References Cited

U.S. PATENT DOCUMENTS

| | | | |
|---|---|---|---|
| 2013/0073720 A1* | 3/2013 | Min | H04L 67/16 709/224 |
| 2013/0190039 A1 | 7/2013 | Lee et al. | |
| 2013/0191229 A1 | 7/2013 | Rodgers et al. | |
| 2013/0262857 A1 | 10/2013 | Neuman et al. | |
| 2014/0213302 A1* | 7/2014 | Yang | H04W 4/21 455/456.3 |
| 2014/0315571 A1* | 10/2014 | Saari | H04W 64/00 455/456.1 |
| 2015/0072618 A1* | 3/2015 | Granbery | H04W 4/21 455/41.2 |
| 2015/0174481 A1* | 6/2015 | Tobin | A63F 13/216 463/7 |
| 2015/0189620 A1* | 7/2015 | Metral | H04L 67/26 709/206 |
| 2015/0242764 A1* | 8/2015 | Subbaraj | G06Q 10/02 705/5 |
| 2015/0287014 A1* | 10/2015 | Granbery | G06Q 20/382 705/75 |
| 2015/0289295 A1* | 10/2015 | Granbery | H04B 5/04 370/230 |
| 2016/0021687 A1* | 1/2016 | Granbery | H04W 40/244 455/41.2 |
| 2016/0150467 A1* | 5/2016 | Shaw | H04W 48/18 370/329 |

* cited by examiner

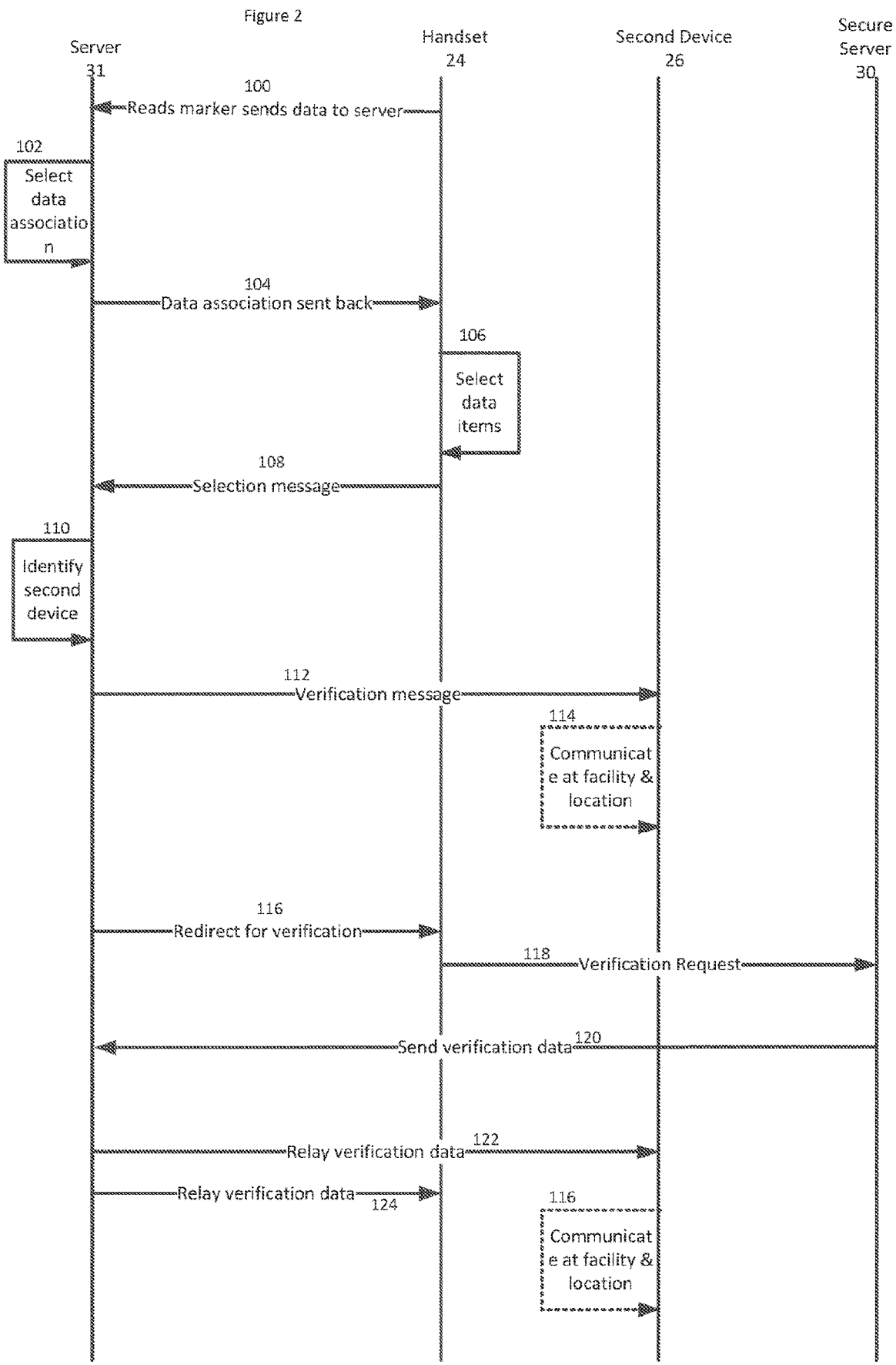

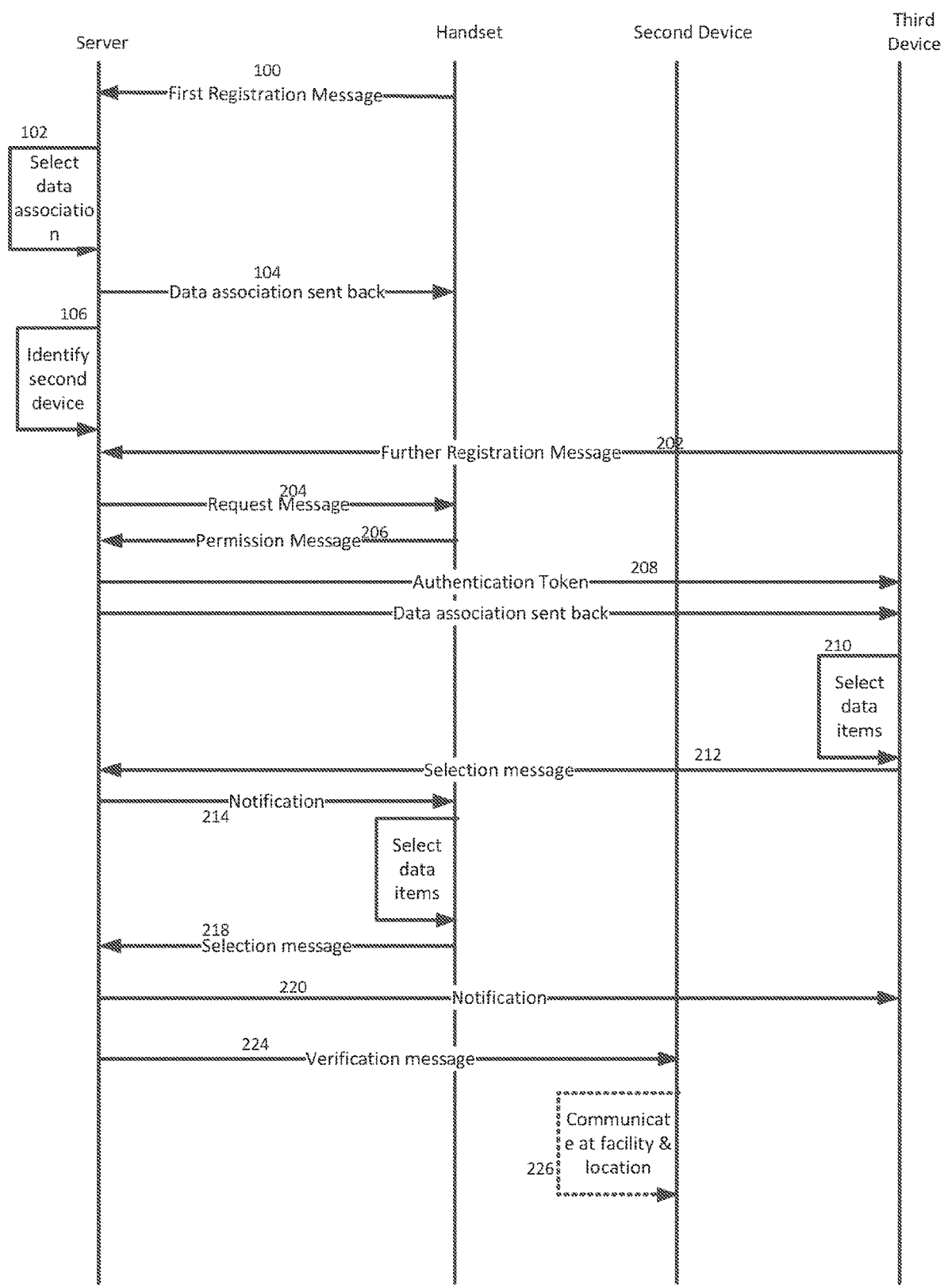

DATA COMMUNICATION APPARATUS AND METHOD FOR VERIFICATION AND SERVICE PROVISION

This application is national phase under 35 U.S.C. § 371 of International Application No. PCT/GB2017/051915, filed Jun. 29, 2017, which claims the benefit of priority to United Kingdom Patent Application No. 1611487.8, filed Jun. 30, 2016, and United Kingdom Patent Application No. 1701599.1, filed Jan. 31, 2017, the entire contents of each of which are hereby incorporated by reference in their entirety.

The present invention relates to methods and apparatus for data communication, and more particularly to verified or secure communication of data.

Wireless local area networks (WLAN) and cellular networks provide increasingly widespread data connectivity. Wireless LANs have become popular in the home due to ease of installation and use, and in facilities such as restaurants, retail locations, and commercial complexes. Such facilities often provide wireless LAN access to their customers to allow them to access the internet, and to interact with them by offering them goods and services, or by sending them advertising messages.

Cellular telephone networks also provide very wide geographic coverage, and in most areas of many countries in the world. The data bandwidth of these networks is increasing and users can now access high bandwidth internet services in a wide variety of locations. Retail and industrial facilities are just two examples—transport hubs such as railway stations and airports provide examples of facilities in which such services can be provided.

This widespread data connectivity represents a significant commercial opportunity because it enables consumers and end users to communicate needs and desires and to purchase services very efficiently. It also permits users of a network to be introduced to one another which in itself can provide the opportunity to generate revenue.

These commercial opportunities however also present technical challenges, not least because the increasing prevalence of the use of communication networks to purchase goods and services has been exploited by criminals who wish to defraud victims or to otherwise take advantage of them; for example, by stealing personal information, which can lead to identity theft. Internet services can be used to present fraudulent solicitations to prospective victims, to conduct fraudulent transactions, or to transmit the proceeds of fraud to financial institutions or to others connected with the scheme.

Aspects and examples of the present disclosure are set out in the claims and aim to address at least these and other technical problems.

One aspect provides a system for controlling data communication at a facility. The system comprises a server for communication with devices at the facility, a data store and a wide area communication interface for communicating with the devices over a wide area network. The data store stores a plurality of data associations, each data association providing a relation between a plurality of data items and a corresponding plurality of reference values—each provides a mapping between data items and reference values—e.g. at least one reference value per item. The data store may also comprise a relation between a set of facility identifiers and these data associations.

Each facility that is to use the system may have machine readable markers installed in it at specified locations. These can be read by a first device at the facility to trigger the first device to send a first registration message to the server. This first registration message comprises: identifier data identifying a user of the first device; location data identifying the specified location at which the marker is installed; and facility data identifying the facility.

The server can then select a data association from the data store based on the facility data. The server sends via the wide area communication interface, to the first device, an association message comprising the selected data association. In establishing verifiable communication with the server, the first device then sends back, to the server, a selection message. This selection message identifies a number of items in the data association that was sent to the device in the association message. These may be chosen by a user to provide a combination of data items which will be recognisable to them. The server can also identify a second device associated with the facility based on the facility data and send, to that second device, a verification message identifying both: the reference values associated with the selected data items; and, the first location.

The second device can then use the combination of the location data and the reference values to provide verified communication to the first location.

Such arrangements can enable a user, presented with information or consumer articles at a facility, to know that the information and/or articles originates with a trusted source. This can reduce or avoid the burden that would otherwise be placed on administrative staff and support workers in such a facility.

The server may be configured to send, to the first device, a redirect message configured to cause the first device to communicate with a secure server. The server may be further configured to obtain, from the secure server, secure verification data based on the reference values associated with the selected data items, and to send to the second device, a notification that the secure verification data has been obtained.

Embodiments of the disclosure will now be described, by way of example only, with reference to the accompanying drawings in which:

FIG. 2 is a timing diagram indicating one method of operation of a network system such as that illustrated in FIG. 1; and FIG. 3 is a timing diagram indicating a method of operation such as that illustrated in FIG. 2.

In the drawings like reference numerals are used to indicate like elements.

Figure 1:
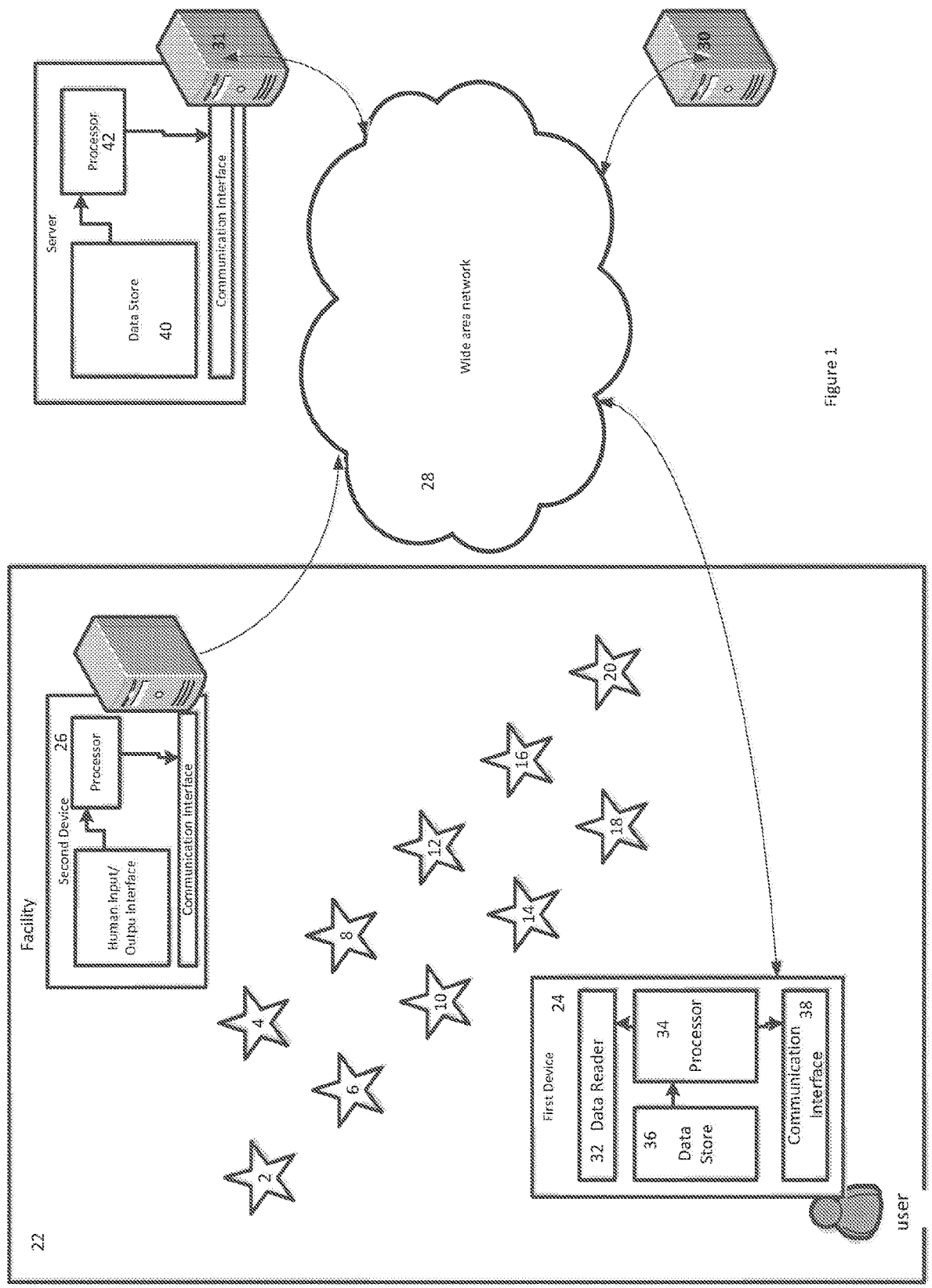
FIG. 1 shows a schematic drawing of a network system.

FIG. 1 shows a network system comprising a server 31 coupled, via a wide area network 28, to communicate with a first device 24 at a facility 22, a second device 26 at the facility 22, and a secure server 30. The secure server 30 comprises a verification database holding identifier details of a plurality of users and is operable to communicate over the wide area network 28 with each of the first device 24, the second device 26, and the server 31. Secure server 30 is illustrated as a separate component to server 31, but it will be appreciated by the skilled addressee having read the present disclosure, that the two components may be provided by the same hardware. For example, a single functional unit.

The server 31 comprises a data store 40 and a processor 42 coupled to a communication interface for communicating over the wide area network 28. The server's data store 40 comprises volatile and/or non-volatile memory storing a plurality of data associations. Each of these data associations provides a relation between, on the one hand a plurality of data items and, on the other hand a corresponding plurality of reference values. This provides a mapping from data items to reference values which may be in the form of a table or other similar data structure. The communications interface of the server 31 typically comprises a modem for internet communication over an optical or copper cable network. Other types of communication may also be used.

A plurality of machine readable markers are distributed about the facility 22—each at a different location within the facility 22. These machine readable markers may be fixed in place and may be carried on a rigid support structure.

The first device 24 comprises a mobile telecommunications handset having a data reader 32 for reading data from a machine readable marker, a data store 36, a processor 34, and a communication interface 38. The processor 34 comprises processing logic configured to control the data reader 32 and the communications interface and to retrieve and provide data to and from the data store 36.

The data reader 32 may comprise a short range radio interface, such as Bluetooth® or a near field RF communications interface such as NFC or RFID. Typically the data store 36 comprises volatile and/or non-volatile memory accessible by the processor 34. The communications interface of the first device 24 is operable to communicate over a wide area network 28. Examples of such interfaces comprise modems for communication over packet switched networks, which may comprise wired and/or wireless components. Such interfaces may also comprise WIFI®, GSM, GPRS, 3GPP, LTE and other mobile communications interfaces.

The processor 34 of the first device 24 is configured to formulate HTTP messages for sending to remote devices over the wide area network 28. For example, the processor 34 is configured so that, in the event that the data reader 32 reads one of the machine readable markers, it sends a registration message via the wide area network 28 to the server 31.

This registration message comprises (i) identifier data identifying a user of the first device 24; (ii) location data identifying the location of the marker which has been read; and (iii) facility 22 data identifying the facility 22. The location data and/or the facility 22 data may be obtained from the marker. The processor 34 of the first device 24 is also configured to receive a data association sent from the server 31 in response to the registration message, and to present this data association to the user to allow the user to make one or more selections of data items. The processor 34 is also configured to allow the user to indicate when the selection process is complete, and to trigger the sending to the server 31 of a completed selection message.

The processor 34 may be configured so that in response to the selection of these items a selection message is sent back to the server 31 to cause the server 31 to update a data resource, stored at the server 31, to provide a record of this selection. Although these and other message described herein may be implemented using HTTP, other protocols may also be used.

The second device 26 at the facility 22 includes a processor, an input/output interface for providing data signals and instructions at the facility 22. It also comprises a communications interface. As with the first device 24, this communications interface is operable to communicate over the wide area network 28 for communication with the server 31. The second device 26 is configured to establish communication with the user at the location indicated by the marker in the event that a verification message is received from the server 31.

A verification message may comprise a numeric value such as the reference values associated with the selected data items, and/or a calculated value based on arithmetic combination of those reference values. The verification message typically also comprises data identifying a particular one of the machine readable markers (such as its location, or another identifier of the marker) and possibly also identification details of the user. The second device 26 is configured to provide verification output signals at the facility 22 based on this data. This can enable verified communication between the second device 26 and the first device 24—for example an output of the second device 26 comprising data from the verification message can be provided to the location of the first device 24. The output may be provided to the location in combination with goods and/or services which are to be supplied to the user at the location.

Operation of the system illustrated in FIG. 1 will now be described with reference to FIG. 2.

As illustrated in FIG. 2, the first device 24 reads a machine readable marker at the facility 22 to obtain location data and facility data from the machine readable marker. The first device 24 then sends 100 a first registration message to the server 31 via the wide area network 28.

The server 31 obtains 102, from the registration message, identifier data identifying a user of the first device 24; and facility data identifying the facility 22 itself. The server 31 then uses the facility data to obtain 102, from the data store 40, data association for that facility 22. This data association may be specific to that facility 22, or it may be associated with a group of facilities—so that the same association message is provided to a first device 24 present at any one of a plurality of facilities. The server 31 then sends 104, to the first device 24, an association message comprising the data association for that facility 22.

The first device 24 receives 106 the association message and provides the association for display to the user to enable the user to select data items from the association. Once the selection is complete, the first device 24 then sends 108 the server 31 a selection message identifying at least one of the data items.

The server 31 uses the facility data sent from the first device 24 to identify 110 a second device 26 at the facility 22. Where a plurality of such devices are present in a given facility 22 the server 31 may also store data indicating proximity between such devices and the location of the markers in the facility 22—this can enable the server 31 also to select between a plurality of second devices at the location. Having identified the correct second device 26, the server 31 then sends 112 a verification message to this second device 26. As noted above, at this stage the second device 26 may then use 114 the verification message to provide trusted communication with the first device 24 at the location.

In some embodiments however the server 31 can also send 116 a redirect message to the first device 24. This redirect message may be configured to cause the first device 24 to send a verification request to the secure server 30—the redirect message may be configured so that the subsequent verification request, sent 118 on to the secure server 30 from the first device 24, comprises a numeric value such as the reference values associated with the selected data items, and/or a calculated value based on arithmetic combination of those reference values.

The secure server 30 then performs a verification process with the first device 24, which may comprise the exchange of secure credentials. If the verification process is successful, the first device 24 and/or the selection data are authenticated by the secure server 30. Provided that this authentication is completed successfully, the secure server sends 120 verification data to the server 31. The server 31 then relays 122, 124 this verification data to both the first device 24 and the second device 26. The second device 26 is configured so that provision of this successfully authenticated verification data triggers communication 126 at the facility 22 between the second device 26 and the first device 24. This communication may be mediated by an output provided at the second user device which may comprise alphanumeric data and/or a communication signal sent over a local communication interface at the facility 22. This can be used to alert the user that the verification procedure is complete, and to trigger user actions and/or other actions at the facility 22.

FIG. 3 illustrates another example of a communication method such as that illustrated in FIG. 2.

As with the method of FIG. 2, the first device 24 reads a machine readable marker at the facility 22, and then sends 100 a first registration message including data from the marker to the server 31 via the wide area network 28.

In the method illustrated in FIG. 3, the server 31 obtains 102, from the registration message, identifier data identifying a user of the first device 24; and facility data identifying the facility 22 itself. The server 31 then uses 102 the facility data to obtain, from the data store 40, data association for that facility 22. This data association may be specific to that facility 22, or it may be associated with a group of facilities—so that the same association message is provided to a first device 24 present at any one of a plurality of facilities. The server 31 then sends 104, to the first device 24, an association message comprising the data association for that facility 22.

A third device at the facility 22 then reads the same machine readable marker at the location. As with the first device 24, the third device is configured so that reading the marker causes it to send 202 a registration message to the server 31. As with the first registration message, this further registration message comprises: identifier data, location data, and facility data. The server 31 compares the relevant data from this further registration message with location data and facility data of the first registration message. In the event that both the location and facility data of the two registration messages match, the server 31 sends 204 a request message to the first device 24 identifying the user of the third device.

The first device 24 may be configured so that, upon receipt of this request message, an alert is triggered at the first device 24 identifying the user of the third device. The first device 24 may also present a request for authorisation of this new user to the user of the first device 24.

In response to this request message, the first device 24 sends 206 a permission message associated with the third device to the server 31. In the event that this message indicates that the user of the first device 24 authorises the new user, the server 31 provides a secure data resource in the data store 40 at the server 31, and sends 208 the data association for the facility 22 to the third device with an authentication token for providing access to the secure data resource. The authentication token may already be known by the first device, or it may be sent from the server 31 to the first device 24.

The third device receives the association message and provides 210 the association for display to the user to enable the user to select data items from the association. Once the selection 210 is complete, the third device then sends 212 the server 31 a selection message identifying at least one of the data items from the data association. This selection message includes the authentication token.

Upon receipt of a selection message the server 31 checks the authentication token against a token stored at the server 31 for the secure data resource. In the event that the authentication token matches the stored token, the server 31 records the selected data items and the corresponding reference values from the selection message into the secure data resource. In addition, the server 31 may also send 214 a notification message to the first device 24 notifying the first device 24 of these selections.

The first device 24 may also send 218 a selection message comprising an authentication token. The server 31 follows the same procedure as when the server 31 receives a selection message from the third device. As in that procedure the authentication token is checked. As in that procedure, if it matches the token stored for the secure data resource the server 31 records the data items and corresponding reference values into the secure data resource and sends 220 a notification message to the second device 24.

Either or both of the first device and the third device may then confirm that the selection process is complete by sending a further selection message to the server 31 comprising a completion token. The server 31 responds to this completion token by sending 224 a verification message to the second device 26 comprising the content of the secure data resource. This provides control of communication from the third device to the second device 26 because the third device can only communicate with the second device 26 (via the secure data resource) if the first device 24 has provided it with the authentication token.

It will be appreciated in the context of the present disclosure that the verification method, using the second server, described above with reference to FIG. 3 may also be used with the method of FIG. 2—for example either or both the first and third devices may communicate with the secure server 30 for authentication.

Once these processes are complete, the second device 26 can initiate communication 226 with either or both of the first and third devices as explained above with reference to FIG. 2.

In these and other embodiments of the disclosure, the second device may be configured to trigger the delivery of an article to the location identified by the machine readable marker. This delivery may accompany the provision of output provided at the second user device. This may be delivered to the location with the article. The output may comprise alphanumeric data confirming the nature and content of the article. As noted above, the output may be provided in the form of a communication signal sent over a local communication interface at the facility 22. This can be used to alert the user that the verification procedure is complete, and to trigger user actions and/or other actions at the facility 22. The second device may also be configured to monitor delivery of the article to the location, and in the event that the article has not been delivered for more than a selected time interval to send to the first device (optionally via the server) a notification. The notification may comprise data selected based on the selection data.

In some embodiments the secure server 30 and the server 31 may be provided by the same hardware. For instance, the same hardware may be provided by a single functional unit. The secure server may be in the form of an application programming interface ("API"), and it is to be appreciated that such an API may be carried in software, and/or may be operable on the same hardware as the server 31. In some embodiments, the server 31 and the secure server 30 may operate using different ports of the same physical server, which have the same IP address. Instead of sending a redirect message 116 to the first device 24 causing the first device to communicate with the secure server, the hardware comprising both servers may be configured to perform a server-side port redirection from a listening port of the server to a port for the secure server. This redirection could be implemented by software operating on the hardware comprising the server and the secure server. For example, when using hypertext transfer protocol, this redirection may be from port 80 (HTTP) to port 443 (HTTPS). This is only one example, and it will be appreciated by the skilled addressee, having read the present disclosure, that this functionality could be achieved in a number of other ways. The user device illustrated in FIG. 1 has been described as a mobile telecommunications handset, but it will be appreciated in the context of the present disclosure that this encompasses any user equipment (UE) for communicating over a wide area network 28 and having the necessary data processing capability. It can be a hand-held telephone, a laptop computer equipped with a mobile broadband adapter, a tablet computer, a Bluetooth gateway, a specifically designed electronic communications apparatus, or any other device. It will be appreciated that such devices may be configured to determine their own location, for example using global positioning systems GPS devices and/or based on other methods such as using information from WLAN signals and telecommunications signals. The user device may comprise a computing device, such as a personal computer, or a handheld device such as a mobile (cellular) telephone or tablet. Wearable technology devices may also be used. Accordingly, the communication interface 38 of the devices described herein may comprise any wired or wireless communication interface such as WI-FI®, Ethernet, or direct broadband internet connection, and/or a GSM, HSDPA, 3GPP, 4G or EDGE communication interface.

Messages described herein may comprise a data payload and an identifier (such as a uniform resource indicator, URI) that identifies the resource upon which to apply the request. This may enable the message to be forwarded across the network to the device to which it is addressed. Some messages include a method token which indicates a method to be performed on the resource identified by the request. For example these methods may include the hypertext transfer protocol, HTTP, methods "GET" or "HEAD". The requests for content may be provided in the form of hypertext transfer protocol, HTTP, requests, for example such as those specified in the Network Working Group Request for Comments: RFC 2616. As will be appreciated in the context of the present disclosure, whilst the HTTP protocol and its methods have been used to explain some features of the disclosure other internet protocols, and modifications of the standard HTTP protocol may also be used.

The processors 34, 42 of the first device 24, the server 31, and the secure server 30 (and any of the activities and apparatus outlined herein) may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof. Such data storage media may also provide the data storage 106 of the first device 24 the server 31, the secure server 30 (and any of the apparatus outlined herein).

The rigid support structure which may carry the markers may include a support surface at approximately waist height, or a higher structure such as a bar at approximately chest height. Beacons, such as wireless beacons, or visible identifiers may be provided at the locations in the facility 22 to enable workers in the facility 22 to identify each marker and quickly to find its location within the facility 22. The markers may be movable within the facility and may report their location to the second device. For example they may comprise motion sensors (such as accelerometers) configured to report their location in the event that they are moved within the facility.

The authentication token may be provided to the third device in response to an authorisation message sent to the server by the first device. In some embodiments however the first device may provide access to the secure data resource by sending an invitation message to the third device. This may be sent to the third device over the wider area network, or by a short range link such as a Bluetooth®, NFC, infrared or other short range communications link. Accordingly, it will be appreciated that embodiments of the disclosure need not use the machine readable markers in order to establish shared access to the secure data resource.

For example, an aspect provides a system for controlling data communication, the system comprising: a server for communication with a plurality of devices, which may be present at a facility. The system also comprises a data store comprising a plurality of data associations, each data association providing a relation between a plurality of data items and a corresponding plurality of reference values. The system also comprises a wide area communication interface, and the server is configured to: receive, from a first device, a first registration message comprising identifier data identifying a user of the first device; and facility data identify the facility. Location data obtained from a machine readable marker may also be included. The server selects a data association from the data store based on the facility data, and sends an association message comprising the selected data association, via the wide area communication interface, to the first device. As with the other embodiments, the server receives from the first device, a selection message identifying selected data items of the selected data association.

The server is configured to store the selection message data in the data store linked to an authentication token, and to provide the authentication token to the first device. This provides a secure data resource—accessible only by use of the token. The first device can then send an invitation message to the third device comprising an identifier of the first device and the authentication token. The invitation message may also comprise data identifying the facility. The third device may then send, to the server a further registration message comprising: further identifier data identifying a user of the third device; and the authentication token. In the event that the authentication token matches the authentication token for the secure data resource, the server sends the selection data from the secure resource to the third device. The server is also configured to trigger update messages to be sent to each of the first and third devices in response to changes to the shared data resource. Once either or both devices have indicated that their selection is complete, the server is configured to send, to the first device and/or the third device, a redirect message configured to cause that device to communicate with the secure server to obtain secure verification data based on the reference values associated with the selected data items as described elsewhere herein.

The machine readable markers can comprise RFID tags, machine readable barcodes, two dimensional bar codes, tuned resonators such as those used in electronic article surveillance theft detection systems (e.g. LCR tank circuit coupled to an antenna), machine recognisable symbols such as shapes, colours, numbers, alphabetic, alphanumeric or non-numeric markings or any capacitive, inductive or electronic marking systems.

As noted above, the processor 34 may be configured so that in response to the selection of items a selection message is sent back to the server 31 to cause the server 31 to update a data resource, stored at the server 31, to provide a record of this selection. In addition, the selection message may be relayed from the server to the second device, or to another device associated with the facility. This device may be configured to trigger a request for the delivery of articles to the facility in the event that it receives more than a threshold number of selections of a particular data item. This threshold may be dynamic, for example it may be updated based on the number of articles associated with that data item which are held at the facility.

In embodiments of the disclosure, the methods and apparatus described herein may be used to control the delivery of consumer articles such as food and drink to the locations in the facility. This delivery may be accompanied by the verification data produced by the second device. This may address the technical problem of how to provide food delivery in a facility without the need for waiting staff. The disclosure may also address the problem of how to reduce the risk of financial loss due to theft or error and/or how to relieve burden on waiting staff in a facility.

It will be appreciated from the discussion above that the embodiments shown in the Figures are merely exemplary, and include features which may be generalised, removed or replaced as described herein and as set out in the claims. With reference to the drawings in general, it will be appreciated that schematic functional block diagrams are used to indicate functionality of systems and apparatus described herein. For example the functionality provided by the data storage may in whole or in part be provided by a processor having one more data values stored on-chip. In addition the processing functionality may also be provided by devices which are supported by the electronic device. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit. For example, the system may be configured such that the secure server and the server are provided by the same hardware, such as being provided by a single functional unit such as the same physical server resource (which may itself comprise a number of physical devices). This single functional unit may be configured to cause the first device to communicate with the secure server. To do this, the single functional unit may obtain from the secure server secure verification data based on the reference values associated with the selected data items, and send to the second device, notification that the secure verification data has been obtained.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

Certain features of the methods described herein may be implemented in hardware, and one or more functions of the apparatus may be implemented in method steps. It will also be appreciated in the context of the present disclosure that the methods described herein need not be performed in the order in which they are described, nor necessarily in the order in which they are depicted in the drawings. Accordingly, aspects of the disclosure which are described with reference to products or apparatus are also intended to be implemented as methods and vice versa. The methods described herein may be implemented in computer programs, or in hardware or in any combination thereof. Computer programs include software, middleware, firmware, and any combination thereof. Such programs may be provided as signals or network messages and may be recorded on computer readable media such as tangible computer readable media which may store the computer programs in not-transitory form. Hardware includes computers, handheld devices, programmable processors, general purpose processors, application specific integrated circuits, ASICs, field programmable gate arrays, FPGAs, and arrays of logic gates.

Other examples and variations of the disclosure will be apparent to the skilled addressee in the context of the present disclosure.

The invention claimed is:

1. A system for controlling data communication at a facility, the system comprising:
   a first server for communication with devices at the facility, wherein the facility comprises a plurality of specified locations in the facility;
   a data store comprising a plurality of data associations, each data association providing a relation between a plurality of data items and a corresponding plurality of reference values;
   a wide area communication interface, for communication between the first server and the facility, wherein a plurality of machine readable markers are each installed at a corresponding one of the plurality of specified locations in the facility, and
   the first server is configured to:
   receive, from a first device, a first registration message comprising:
       identifier data identifying a user of the first device;
       location data identifying a first location of the plurality of specified locations; and
       facility data identifying the facility;
   select a data association from the data store based on the facility data;

send an association message comprising the selected data association, via the wide area communication interface, to the first device;
receive from the first device, a selection message identifying selected data items of the selected data association;
identify a second device associated with the facility based on the facility data;
send, to the second device, a verification message identifying:
the reference values associated with the selected data items; and
the first location;
enable the first device to obtain confirmation at the facility from the second device, wherein the confirmation is based on the verification message; and
send a request message to the first device identifying a user of a third device, to enable the first device to respond to the request message by triggering an alert at the first device requesting authorisation of the user of the third device, and wherein the request message comprises a request to provide access to a secure data resource.

2. The system of claim 1, wherein the first server is configured to
cause the first device to communicate with a secure server; and to
obtain, from the secure server, secure verification data based on the reference values associated with the selected data items; and to
send to the second device, notification that the secure verification data has been obtained.

3. The system of claim 2 wherein the secure server and the first server are provided by the same hardware comprising one or more functional units.

4. The system of claim 3 wherein the one or more functional units are configured to perform a port redirection to cause the first device to communicate with the secure server.

5. The system of claim 2 wherein causing the first device to communicate with the secure server comprises the first server sending, to the first device, a redirect message configured to cause the first device to communicate with the secure server.

6. The system of claim 1 wherein the first server is configured to:
receive, from the third device, a further registration message comprising:
further identifier data identifying the user of the third device;
further location data identifying a location; and
further facility data identifying a facility, and
wherein sending the request message to the first device identifying the user of the third device comprises sending the request message in the event that the further location data and the further facility data match the location and facility of the first registration message.

7. The system of claim 6 wherein the first server is configured to receive from the first device, in response to said request message, a permission message associated with the third device and to provide an authentication token to the third device based on the permission message.

8. The system of claim 7 wherein the first server is configured so that, in the event the permission message grants permission to the third device, the first server sends the association message, via the wide area communication interface, to the third device.

9. A computer implemented method comprising:
receiving, from a first device, a first registration message comprising:
identifier data identifying a user of the first device;
facility data identifying a facility, wherein the facility comprises a plurality of specified locations; and
location data identifying a first location of the plurality of specified locations;
selecting, based on the facility data, a stored data association;
sending an association message comprising the selected data association, via a wide area communication interface, to the first device wherein the data association provides a relation between a plurality of data items and a corresponding plurality of reference values;
receiving from the first device, a selection message identifying selected data items of the selected data association;
identifying a second device associated with the facility based on the facility data;
sending, to the second device, a verification message identifying:
the reference values associated with the selected data items; and
the first location;
enabling the first device to obtain confirmation at the facility from the second device, wherein the confirmation is based on the verification message; and
sending a request message to the first device identifying the user of a third device, to enable the first device to respond to the request message by triggering an alert at the first device requesting authorisation of the user of the third device, and wherein the request message comprises a request to provide access to a secure data resource.

10. The method of claim 9 comprising:
responding to the selection message by causing the first device to communicate with a secure server; and to
obtain, from the secure server, secure verification data based on the reference values associated with the selected data items;
receiving a notification message from the secure server indicating that the secure verification data has been obtained by the first device; and
sending, to the second device, notification that the secure verification data has been obtained.

11. The method of claim 9 comprising:
receiving, from the third device, a further registration message comprising:
further identifier data identifying the user of the third device;
further location data identifying a location; and
further facility data identifying a facility; and
comparing the further location data and the further facility data with the location data and facility data of the first registration message, and
wherein sending the request message to the first device identifying the user of the third device comprises sending the request message in the event that the comparing indicates a match.

12. The method of claim 11 comprising:
receiving from the first device, in response to said request message, a permission message associated with the third device; and
controlling communication between the third device and the second device based on the permission message, wherein controlling communication from the third device to the second device comprises controlling selection messages from the third device.

13. The method of claim 12 comprising sending the association message, via the wide area communication interface, to the third device in the event the permission message grants permission to the third device.

14. A mobile communications apparatus comprising:
a data reader for reading a machine readable marker at a facility, wherein the facility comprises a plurality of specified locations and each location comprises a corresponding machine readable marker identifying the each location;
a wide area communication interface, for communication with a first server over a wide area network;
and a controller, wherein the controller is configured to:
obtain location data and facility data via the data reader from one of the machine readable markers;
send a first registration message to the first server, the first registration message comprising:
identifier data identifying a user of the mobile communications apparatus;
the location data; and
the facility data, wherein the facility data identifies the facility;
receive an association message comprising a data association selected based on the facility data, wherein the data association provides a relation between a plurality of data items and a corresponding plurality of reference values;
send, to the first server, a selection message identifying selected data items of the data association to enable the first server to identify a second device associated with the facility based on the facility data and to send, to the second device, a verification message identifying:
the reference values associated with the selected data items; and
the first location;
obtain confirmation at the facility from the second device, wherein the confirmation is based on the verification message; and
respond to a request message received from the first server identifying a user of a third device by triggering an alert at the mobile communications apparatus requesting authorisation of the user of the third device, wherein the request message comprises a request to provide access to a secure data resource.

15. The apparatus of claim 14 wherein the controller is configured to
send, to a secure server, verification commands to verify content of the selection message, wherein the secure server provides to the first server, in response to the verification commands, secure verification data based on the reference values associated with the selected data items to cause the first server to send to the second device, notification that the secure verification data has been obtained.

16. The apparatus of claim 15 wherein the controller is configured to send the verification commands to the secure server in response to receiving, from the first server, a redirect message comprising an identifier of the secure server.

17. The apparatus of claim 14 wherein the controller is configured to send to the first server, in response to said request message, a permission message associated with the third device to cause the first server to control communication between the third device and the second device based on the permission message.

18. The apparatus of claim 17 wherein controlling communication from the third device to the second device comprises controlling selection messages from the third device.

* * * * *